United States Patent
Shen et al.

(10) Patent No.: US 9,699,672 B2
(45) Date of Patent: Jul. 4, 2017

(54) METHOD FOR ESTABLISHING CORRESPONDENCE BETWEEN SECTOR OF BASE STATION AND ANTENNA, BASE STATION, AND ANTENNA

(71) Applicant: Huawei Technologies Co., Ltd., Shenzhen (CN)

(72) Inventors: Jian Shen, Shenzen (CN); Kari Piispanen, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/350,991

(22) Filed: Nov. 14, 2016

(65) Prior Publication Data

US 2017/0064570 A1    Mar. 2, 2017

Related U.S. Application Data

(63) Continuation of application No. PCT/CN2014/077316, filed on May 12, 2014.

(51) Int. Cl.
*H04M 1/00* (2006.01)
*H04B 1/38* (2015.01)
(Continued)

(52) U.S. Cl.
CPC .......... *H04W 24/02* (2013.01); *H04B 1/1607* (2013.01); *H04B 15/00* (2013.01); *H04W 24/08* (2013.01)

(58) Field of Classification Search
CPC ...... H04W 24/02; H04W 24/08; H04B 15/00; H04B 1/1607
See application file for complete search history.

(56) References Cited

U.S. PATENT DOCUMENTS 7,012,413 B1 * 3/2006 Ye .................... H02M 1/42
                                            323/222
7,558,334 B2 * 7/2009 McCune ............ H04L 27/20
                                            332/149

(Continued)

OTHER PUBLICATIONS

"3rd Generation Partnership Project; Technical Specification Group Radio Access Network; UTRAN Iuant Interface: Remote Electrical Tilting (RET) antennas Application Part (RETAP) signalling (Release 7)," 3GPP TS 25.463, V7.5.0, Technical Specification, Mar. 2007, 41 pages.

(Continued)

*Primary Examiner* — Dominic Rego
(74) *Attorney, Agent, or Firm* — Conley Rose, P.C.

(57) ABSTRACT

The present disclosure provides a method for establishing a correspondence between a sector of a base station and an antenna, a base station, and an antenna. The base station (or the antenna) generates a modulation signal, and a radio frequency port corresponding to the antenna (or the base station) can receive the modulation signal. Then, the base station determines that there is a correspondence between a radio frequency port that is on the base station side and that sends the modulation signal and a radio frequency port that is on the antenna side and that receives the modulation signal. Therefore, the base station establishes a correspondence between a sector and the antenna, which is highly efficient and highly accurate in comparison with a manual recording manner.

11 Claims, 10 Drawing Sheets

(51) Int. Cl.
*H04W 24/02* (2009.01)
*H04W 24/08* (2009.01)
*H04B 15/00* (2006.01)
*H04B 1/16* (2006.01)

(56) References Cited

U.S. PATENT DOCUMENTS

| | | | |
|---|---|---|---|
| 7,937,063 B1 | 5/2011 | Rausch et al. | |
| 2007/0183530 A1* | 8/2007 | Udagawa | H03F 1/02 |
| | | | 375/297 |
| 2007/0216370 A1* | 9/2007 | Zhou | H02J 7/06 |
| | | | 320/141 |
| 2009/0141623 A1* | 6/2009 | Jung | H01Q 1/1242 |
| | | | 370/229 |
| 2010/0056068 A1* | 3/2010 | Takinami | H04B 1/0057 |
| | | | 455/73 |
| 2011/0273226 A1* | 11/2011 | Huang | G09G 3/3677 |
| | | | 327/538 |
| 2012/0187870 A1* | 7/2012 | Iwai | H05B 33/0884 |
| | | | 315/307 |
| 2013/0021790 A1* | 1/2013 | Hsu | G09F 19/02 |
| | | | 362/217.1 |
| 2013/0140890 A1* | 6/2013 | Nisonen | H02H 9/025 |
| | | | 307/24 |
| 2013/0235962 A1* | 9/2013 | O'Keefe | H01Q 3/267 |
| | | | 375/371 |
| 2013/0249298 A1* | 9/2013 | Dong | H02J 3/005 |
| | | | 307/80 |
| 2013/0316667 A1* | 11/2013 | Zhang | H04B 1/0475 |
| | | | 455/114.2 |
| 2014/0268900 A1* | 9/2014 | Hu | H02M 3/158 |
| | | | 363/18 |
| 2015/0195001 A1* | 7/2015 | Barker | H04B 7/0617 |
| | | | 342/367 |
| 2016/0028244 A1* | 1/2016 | Ichikawa | H02J 5/005 |
| | | | 307/104 |

OTHER PUBLICATIONS

"AISG Extension: Remote Azimuth Steering, Remote Azimuth Steering Extension to the Control Interface for Antenna Line Devices," AISG Extension: Remote Azimuth Steering, Standard No. AISG-ES-RAS, v2.2.0, Jan. 31, 2013, 20 pages.
Foreign Communication From A Counterpart Application, European Application No. 14892181.0, European Office Action dated Mar. 27, 2017, 9 pages.

* cited by examiner

METHOD FOR ESTABLISHING CORRESPONDENCE BETWEEN SECTOR OF BASE STATION AND ANTENNA, BASE STATION, AND ANTENNA

CROSS-REFERENCE TO RELATED APPLICATIONS

This application is a continuation application of international patent application number PCT/CN2014/077316 filed on May 12, 2014, which is incorporated by reference.

TECHNICAL FIELD

The present disclosure relates to the field of communications technologies, and in particular, to a method for establishing a correspondence between a sector of a base station and an antenna, a base station, and an antenna.

BACKGROUND

For a remote electrical tilt (RET) antenna, a beam downtilt angle of the antenna may be adjusted at a remote control center by using a network, which can greatly reduce costs of adjusting and maintaining an antenna downtilt angle and improve work efficiency. For a wireless network using a remote electrical tilt antenna, a network optimization engineer may adjust, at an operation and maintenance center of a base station, a downtilt angle of the remote electrical tilt antenna corresponding to a sector of the base station, so as to improve coverage of the sector and improve performance of the wireless network.

Generally, the base station includes multiple sectors (for example, three), and each of the multiple sectors is corresponding to at least one remote electrical tilt antenna. Because the operation and maintenance center does not have a correspondence between a sector and an antenna, when optimizing a sector at the operation and maintenance center, the network optimization engineer cannot learn that a downtilt angle of which remote electrical tilt antenna is to be adjusted to improve coverage of the sector.

According to a conventional solution, construction personnel record a correspondence between a radio frequency (RF) port of a remote electrical tilt antenna and an RF port of a base station. Because a radio frequency signal is transferred between the base station and the remote electrical tilt antenna by using the RF ports, a correspondence between the remote electrical tilt antenna and a sector can be obtained, and then the correspondence between the remote electrical tilt antenna and the sector is configured at the operation and maintenance center, so as to adjust the remote electrical tilt antenna according to the configured correspondence. However, in a manual recording manner, a serial number of the remote electrical tilt antenna is may be incorrectly written down, and entering a recorded correspondence into a system is error-prone. Therefore, a problem of a high error rate exists, and efficiency of manual recoding is low.

SUMMARY

Embodiments of the present disclosure provide a method for establishing a correspondence between a sector of a base station and an antenna, a base station, and an antenna to resolve problems of low accuracy, low efficiency, and high labor costs in some approaches.

To resolve the foregoing technical problems, the embodiments of the present disclosure disclose the following technical solutions:

According to a first aspect, the present disclosure provides a base station, including: a T-shaped bias tee, a modulation circuit, a base station controller, and a direct-current power supply, where both a quantity of the T-shaped bias tees and a quantity of the modulation circuits are the same as a quantity of base station radio frequency ports; an input end of the modulation circuit is connected to the direct-current power supply, an output end is connected to a direct-current input end of the T-shaped bias tee, a control end is connected to an output end of the base station controller, and the modulation circuit is configured to generate a modulation signal; a radio frequency signal is input to an alternating-current input end of the T-shaped bias tee, and an output end is connected to a base station radio frequency port; the T-shaped bias tee is configured to: couple the modulation signal and the radio frequency signal to obtain a coupled signal, and transmit the coupled signal to a corresponding antenna by using the base station radio frequency port, so that the antenna demodulates the coupled signal, and transmits feedback information to the base station by using an Antenna Interface Standards Group (AISG) input port, where the feedback information includes identifier information of an antenna radio frequency port receiving the coupled signal; and the base station controller is configured to: control the modulation circuit to generate the modulation signal, receive the feedback information, and establish a correspondence between a sector of the base station and the antenna according to the feedback information.

With reference to the first aspect, in a first possible implementation manner of the first aspect, the output end of the base station controller outputs identifier information of the base station radio frequency port connected to the T-shaped bias tee; and the modulation circuit adds the identifier information of the base station radio frequency port to a direct-current voltage signal to obtain the modulation signal.

With reference to the first aspect or the first possible implementation manner of the first aspect, in a second possible implementation manner of the first aspect, the modulation circuit includes a control switch and a co-directional diode series branch circuit; an anode of the co-directional diode series branch circuit is the input end of the modulation circuit, and a cathode is the output end of the modulation circuit; and the control switch is connected in parallel to two ends of the co-directional diode series branch circuit by using a first end and a second end, and a control end of the control switch is the control end of the modulation circuit.

With reference to the second possible implementation manner of the first aspect, in a third possible implementation manner of the first aspect, the control switch is an NPN transistor or an n-type metal-oxide-semiconductor (NMOS) transistor, where a base electrode of the NPN transistor is the control end of the control switch, a collector electrode is connected to the anode of the co-directional diode series branch circuit, and an emitter electrode is connected to the cathode of the co-directional diode series branch circuit; or a gate electrode of the NMOS transistor is the control end of the control switch, a drain electrode is connected to the anode of the co-directional diode series branch circuit, and a source electrode is connected to the cathode of the co-directional diode series branch circuit.

According to a second aspect, the present disclosure further provides an antenna, including: a remote control unit (RCU), and a T-shaped bias tee and a demodulation circuit that are in one-to-one correspondence with an antenna radio frequency port, where an alternating-current input end of the T-shaped bias tee is connected to an antenna radio frequency port, a direct-current output end is connected to an input end of the demodulation circuit, and an alternating-current output end outputs a radio frequency signal; the T-shaped bias tee is configured to: decouple a coupled signal provided by a base station to obtain a modulation signal, and provide the modulation signal to the demodulation circuit, where the coupled signal is obtained by coupling the modulation signal and the radio frequency signal by the base station; an output end of the demodulation circuit is connected to an input end of the RCU, and the demodulation circuit is configured to: demodulate the modulation signal, and then provide a demodulated signal to the RCU; and the RCU is configured to: generate feedback information according to the demodulated signal and identifier information corresponding to the antenna radio frequency port receiving the coupled signal, and provide the feedback information to the base station by using an AISG input port, where the feedback information is used to enable the base station to establish a correspondence between a sector of the base station and the antenna.

With reference to the second aspect, in a first possible implementation manner of the second aspect, when there are multiple antenna radio frequency ports, the antenna further includes: a single-pole multi-throw switch, where a non-movable end of the single-pole multi-throw switch is connected to the input end of the RCU, movable ends are separately connected to the output ends of the demodulation circuits, and the RCU controls a switch-on or switch-off state of the single-pole multi-throw switch.

With reference to the second aspect, in a second possible implementation manner of the second aspect, the demodulation circuit includes: a comparator, where a non-inverting input end of the comparator is connected to the alternating-current output end of the T-shaped bias tee by using a capacitor, an inverting input end is connected to a grounding end by using a current-limiting resistor, an output end is connected to the input end of the RCU, and the output end is connected to the inverting input end by using a feedback resistor.

According to a third aspect, the present disclosure further provides a base station, including: a T-shaped bias tee, a detection resistor, a current detection circuit, a demodulation circuit, a base station controller, and a direct-current power supply, where the T-shaped bias tee, the current detection circuit, and the demodulation circuit are all in one-to-one correspondence with a base station radio frequency port; a direct-current input end of the T-shaped bias tee is connected to the direct-current power supply by using the detection resistor, a radio frequency signal is input to an alternating-current input end, and an alternating-current output end is connected to a base station radio frequency port; two input ends of the current detection circuit are connected in parallel to two ends of the detection resistor, an output end is connected to an input end of the demodulation circuit, and the current detection circuit is configured to detect a current modulation signal fed back by an antenna; the T-shaped bias tee is configured to: couple a direct-current signal input from the direct-current input end and the radio frequency signal to obtain a coupled signal, and transmit the coupled signal to the antenna, so that the antenna splits the coupled signal to obtain the direct-current signal, modulates a current of the direct-current signal to obtain the current modulation signal, and feeds back the current modulation signal to the base station by using an antenna radio frequency port, where the current modulation signal includes identifier information of the antenna radio frequency port receiving the coupled signal; an output end of the demodulation circuit is connected to an information input end of the base station controller, and the demodulation circuit is configured to demodulate the current modulation signal detected by the current detection circuit to obtain a demodulated signal; and the base station controller is configured to: determine a correspondence between the antenna radio frequency port and the base station radio frequency port according to the demodulated signal, establish a correspondence between a sector of the base station and the antenna, and control, by using an AISG port, the antenna to generate the current modulation signal.

With reference to the third aspect, in a first possible implementation manner of the third aspect, the demodulation circuit includes: a comparator, where a non-inverting input end of the comparator is connected to the output end of the current detection circuit by using a capacitor, an inverting input end is connected to a grounding end by using a current-limiting resistor, an output end is connected to the information input end of the base station controller, and the output end is connected to the inverting input end by using a feedback resistor.

According to a fourth aspect, the present disclosure further provides an antenna, including: a remote control unit RCU, and a T-shaped bias tee and a modulation circuit that are in one-to-one correspondence with an antenna radio frequency port, where: an alternating-current input end of the T-shaped bias tee is connected to a radio frequency port on the antenna side, a direct-current output end is connected to an input end of the modulation circuit, and the T-shaped bias tee is configured to split a coupled signal transmitted by a base station to obtain a direct-current signal; a control end of the modulation circuit is connected to an output end of the RCU; and the RCU is configured to control, according to a control signal transmitted by the base station, the modulation circuit to modulate a current of the direct-current signal output by the T-shaped bias tee to obtain a current modulation signal, so that the base station detects the current modulation signal, determines a correspondence between an antenna radio frequency port and a base station radio frequency port according to the current modulation signal, and establishes a correspondence between a sector of the base station and the antenna.

With reference to the fourth aspect, in a first possible implementation manner of the fourth aspect, the modulation circuit includes: a pull-down resistor and a control switch, where a first end of the control switch is connected to a grounding end by using the pull-down resistor, a second end is the input end of the modulation circuit, and a control end of the control switch is the control end of the modulation circuit.

With reference to the fourth aspect, in a second possible implementation manner of the fourth aspect, the output end of the RCU outputs identifier information of the antenna radio frequency port connected to the T-shaped bias tee; and the modulation circuit adds the identifier information of the antenna radio frequency port to the direct-current signal to obtain the current modulation signal.

According to a fifth aspect, the present disclosure further provides a method for establishing a correspondence between a sector of a base station and an antenna, and the method is applied to a base station and includes: generating a modulation signal when a request for establishing a correspondence between a sector of the base station and an antenna is received; coupling the modulation signal and a radio frequency signal to obtain a coupled signal, and transmitting the coupled signal to the antenna, so that the antenna demodulates the modulation signal, and feeds back, to the base station, included identifier information of an antenna radio frequency port receiving the demodulated signal; receiving the feedback information, and parsing the feedback information to obtain the identifier information of the antenna radio frequency port; and establishing a correspondence between the identifier information of the antenna radio frequency port and a base station radio frequency port sending the coupled signal, and obtaining the correspondence between the sector of the base station and the antenna.

With reference to the fifth aspect, in a first possible implementation manner of the fifth aspect, the generating a modulation signal includes: adding identifier information of the base station radio frequency port to a direct-current voltage signal to obtain the modulation signal.

According to a sixth aspect, the present disclosure further provides a method for establishing a correspondence between a sector of a base station and an antenna, and the method is applied to an antenna and includes: receiving a coupled signal transmitted by a base station, where the coupled signal is obtained by coupling a radio frequency signal and a modulation signal generated by the base station; splitting the coupled signal to obtain the modulation signal; and generating feedback information according to the modulation signal and identifier information corresponding to an antenna radio frequency port receiving the modulation signal, and transmitting the feedback information to the base station, so that the base station establishes a correspondence between a sector of the base station and the antenna according to the feedback information.

With reference to the sixth aspect, in a first possible implementation manner of the sixth aspect, the generating feedback information according to the modulation signal and identifier information corresponding to an antenna radio frequency port receiving the modulation signal includes: demodulating the modulation signal to obtain identifier information of a base station radio frequency port transmitting the modulation signal, where the modulation signal is obtained by adding the identifier information of the radio frequency port to a direct-current voltage signal by the base station; and generating the feedback information according to the identifier information of the base station radio frequency port and the antenna radio frequency port receiving the modulation signal.

According to a seventh aspect, the present disclosure further provides a method for establishing a correspondence between a sector of a base station and an antenna, and the method is applied to a base station and includes: coupling a direct-current voltage signal and a radio frequency signal to obtain a coupled signal, and transmitting the coupled signal to an antenna, so that the antenna splits the coupled signal to obtain the direct-current signal, modulates a current of the direct-current signal to obtain a current modulation signal, and feeds back the current modulation signal to the base station, where the current modulation signal includes identifier information of an antenna radio frequency port receiving the coupled signal; detecting the current modulation signal generated by the antenna, and demodulating the current modulation signal to obtain the identifier information of the antenna radio frequency port; and establishing a correspondence between a sector of the base station and the antenna according to the identifier information of the antenna radio frequency port and a base station radio frequency port generating the coupled signal.

According to an eighth aspect, the present disclosure further provides a method for establishing a correspondence between a sector of a base station and an antenna, and the method is applied to an antenna and includes: splitting a coupled signal transmitted by a base station to obtain a direct-current signal; modulating the direct-current signal according to identifier information of an antenna radio frequency port receiving the coupled signal to obtain a current modulation signal; and transmitting the current modulation signal to the base station, so that the base station demodulates the current modulation signal to obtain the identifier information of the antenna radio frequency port, and establishes a correspondence between a sector of the base station and the antenna according to the identifier information of the antenna radio frequency port and identifier information of a base station radio frequency port sending the coupled signal.

It can be seen from the foregoing technical solutions that the embodiments of the present disclosure provide the method for establishing a correspondence between a sector of a base station and an antenna. A base station generates a modulation signal, and transmits the modulation signal to a corresponding antenna by using a radio frequency port. After receiving the modulation signal, an antenna generates feedback information that includes identifier information of an antenna radio frequency port receiving the modulation signal, and feeds back the feedback information to the base station. Therefore, the base station determines that there is a correspondence between the base station radio frequency port sending the modulation signal and the antenna radio frequency port receiving the modulation signal, and further establishes a correspondence between a sector of the base station and the antenna, which is highly efficient and highly accurate in comparison with a manual recording manner.

The present disclosure provides another method for establishing a correspondence between a sector of a base station and an antenna. An antenna generates a current modulation signal that includes identifier information of an antenna RF port. A base station can detect the current modulation signal, and demodulate the current modulation signal to obtain the antenna RF port generating the current modulation signal. Therefore, the base station determines that there is a correspondence between the antenna RF port generating the current modulation signal and a base station RF port detecting the current modulation signal, and further automatically establishes a correspondence between a sector and the antenna, which is highly efficient and highly accurate in comparison with a manual recording manner.

BRIEF DESCRIPTION OF DRAWINGS

Accompanying drawings of the specification constructs a part of this application and are provided for further understanding of the present disclosure. Exemplary embodiments and descriptions thereof in the present disclosure are used to explain the present disclosure and do not constitute improper limitation on the present disclosure. In the accompanying drawings.

To describe the technical solutions in the embodiments of the present disclosure more clearly, the following briefly describes the accompanying drawings required for describing the embodiments. A person of ordinary skill in the art may still derive other drawings from these accompanying drawings without creative efforts.

DESCRIPTION OF EMBODIMENTS

To achieve an objective of the present disclosure, the present disclosure provides a method for establishing a correspondence between a sector of a base station and an antenna, a base station, and an antenna. A modulation signal is sent between the base station and a remote electrical tilt antenna, and a correspondence between a radio frequency port side sending the modulation signal and a radio frequency port side receiving the modulation signal is determined. Therefore, the base station can automatically obtain a correspondence between a radio frequency port of the remote electrical tilt antenna and a base station radio frequency port, which is highly accurate and highly efficient in comparison with a manual recording manner.

The foregoing is the core idea of the present disclosure. To make a person skilled in the art better understand the solutions in the present disclosure, the following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
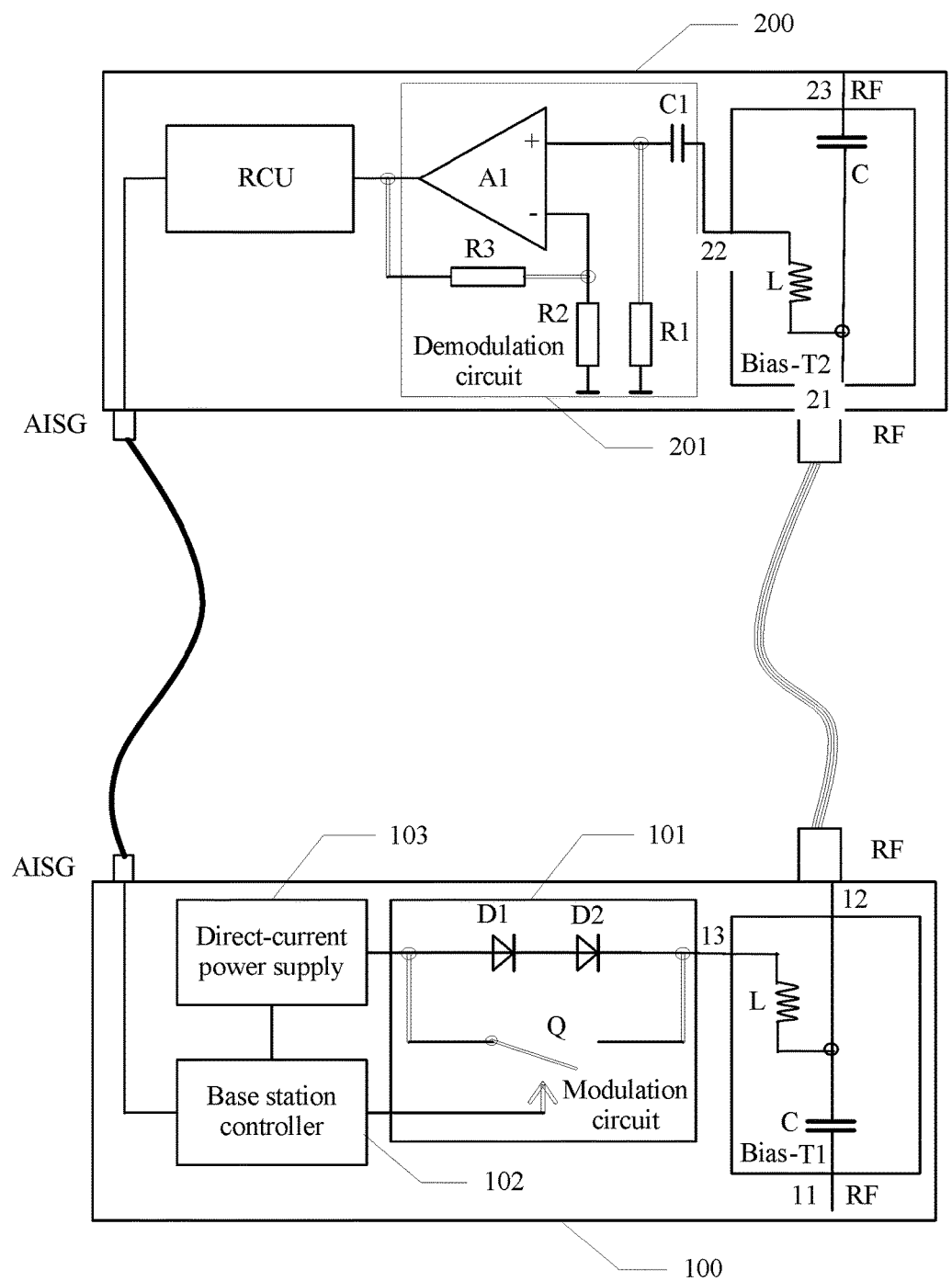
FIG. 1 shows a schematic structural diagram of a connection between a base station and an antenna according to an embodiment of the present disclosure.

Referring to FIG. 1, FIG. 1 shows a schematic structural diagram of a connection between a base station and an antenna according to an embodiment of the present disclosure. FIG. 1 shows merely a part of a structure that is inside the base station and the antenna and that is used to automatically establish a correspondence between a sector and the antenna, and other parts that are irrelevant to the technical solutions of the present disclosure are not shown.

As shown in FIG. 1, a base station 100 includes a Bias-T 1 (a T-shaped bias tee), a modulation circuit 101, a base station controller 102, and a direct-current power supply 103. Both the Bias-T 1 and the modulation circuit 101 are in one-to-one correspondence with a base station RF port. That is, each base station RF port is corresponding to one Bias-T 1 and one modulation circuit 101.

An input end of the modulation circuit 101 is connected to the direct-current power supply 103, an output end is connected to a direct-current input end of the Bias-T, and a control end is connected to an output end of the base station controller 102.

A radio frequency signal is input to an alternating-current input end 11 of the Bias-T 1, and an alternating-current output end 12 is connected to a base station RF port R01. The Bias-T 1 is configured to: couple a modulation signal transmitted by the modulation circuit 101 and the radio frequency signal received by the alternating-current input end 12 to obtain a coupled signal, and transmit the coupled signal to a corresponding antenna RF port by using the base station RF port.

As shown in FIG. 1, an antenna 200 includes an RCU, a bias-T 2, and a demodulation circuit 201. Both the Bias-T 2 and the demodulation circuit 201 are in one-to-one correspondence with an antenna RF port.

An alternating-current input end 21 of the Bias-T 2 is connected to an antenna RF port A01, a direct-current output end 22 is connected to an input end of the demodulation circuit 201, and an alternating-current output end 23 outputs a radio frequency signal. An output end of the demodulation circuit 201 is connected to an input end of the RCU.

An AISG input port of the antenna 200 is connected to an AISG port of the base station 100, and is configured to receive a control instruction transmitted by the base station.

A process of automatically establishing a correspondence between a sector and an antenna in a system shown in FIG. 1 is as follows:

When receiving a check request delivered by an operation and maintenance center, the base station controller 102 inside the base station 100 controls the modulation circuit 101 to generate a corresponding modulation signal, and provides the modulation signal to the Bias-T 1. The Bias-T 1 couples the modulation signal and the radio frequency signal that is received by the alternating-current input end to obtain a coupled signal, and transmits the coupled signal to the antenna 200 by using the RF port R01.

After the antenna 200 receives the coupled signal transmitted by the base station side, the Bias-T 2 splits the coupled signal into the radio frequency signal and the modulation signal, outputs the radio frequency signal by using the alternating-current output end 23, and provides the modulation signal to the demodulation circuit 201 by using the direct-current output end 22. The demodulation circuit 201 demodulates the modulation signal, and then provides a demodulated signal to the RCU. The RCU generates feedback information according to the demodulated signal and identifier information of the antenna RF port receiving the coupled signal, and feeds back the feedback information to the base station 100 by using an AISG bus.

The base station controller 102 inside the base station 100 determines, according to the feedback information that is fed back by the antenna 200 and that includes the identifier information of the antenna RF port and according to transmission of the coupled signal between the base station and the antenna RF port, that the base station RF port sending the coupled signal is corresponding to the antenna RF port receiving the coupled signal, and further determines a correspondence between a sector of the base station and the antenna according to a relationship between the base station RF port and the sector.

The base station provided in this embodiment can generate a modulation signal, couple the modulation signal to a radio frequency signal, and then transmit a coupled signal to an antenna RF port by using a base station RF port. After receiving the coupled signal, the antenna side splits the coupled signal to obtain the modulation signal, and feeds back, to the base station, the antenna RF port receiving the coupled signal that includes the modulation signal. Therefore, the base station obtains a correspondence between the base station RF port and the antenna RF port, and automatically establishes a correspondence between a sector of the base station and the antenna, which is highly efficient and highly accurate in comparison with a manual recording manner.

Optionally, as shown in FIG. 1, the modulation circuit 101 on the base station 100 side includes a co-directional diode series branch circuit and a control switch Q.

The co-directional diode series branch circuit includes co-directional diodes in series, for example, D1 and D2. After D1 and D2 are connected in series in a same direction, an anode of D1 is an anode of the co-directional diode series branch circuit, and a cathode of D2 is a cathode of the co-directional diode series circuit.

The control switch Q is connected in parallel to two ends of the co-directional diode series branch circuit. Specifically, a first end of Q is connected to the anode of D1, and a second end of Q is connected to the cathode of D2. A control end of Q is connected to the output end of the base station controller 102, and the base station controller 102 controls a switch-on or switch-off state of Q.

Q may be implemented by using a switch transistor, for example, an NPN transistor or an NMOS transistor. A base electrode of the NPN transistor is the control end of Q, a collector electrode is connected to the anode of the co-directional diode series branch circuit, and an emitter electrode is connected to the cathode of the co-directional diode series branch circuit. A gate electrode of the NMOS transistor is the control end of Q, a drain electrode is connected to the anode of the co-directional diode series branch circuit, and a source electrode is connected to the cathode of the co-directional diode series branch circuit.

Normally, Q is closed. In this case, a direct current passes Q and is transmitted to the direct-current input end 13 of the Bias-T 1, and no direct current passes the co-directional diode series branch circuit.

Figure 2:
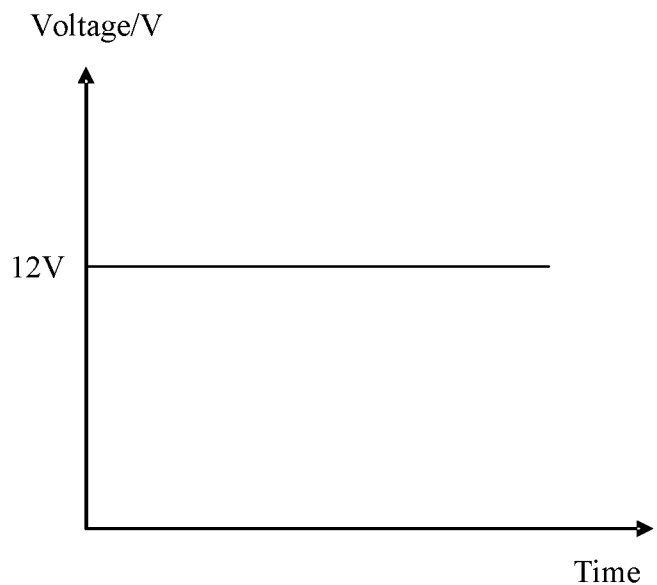
FIG. 2 shows a schematic diagram of a voltage waveform of a direct-current power supply according to an embodiment of the present disclosure.

When receiving a request for automatically establishing a correspondence between the sector and the antenna, the base station controller 102 generates a control signal to control Q to be opened. In this case, a direct current passes the co-directional diode series branch circuit and is transmitted to the direct-current input end 13 of the Bias-T 1. Because there is a current passing through the diode, a forward conduction voltage-drop is generated in the diode, and a sum of a voltage-drop of D1 and that of D2 is 1.4 V. In this case, a direct-current voltage signal input from the direct-current input end 13 of the Bias-T is Vcc-1.4, where Vcc is a voltage of the direct-current power supply 103. Referring to FIG. 2, FIG. 2 shows a waveform diagram of Vcc, for example, Vcc is constantly 12 V.

Figure 3:
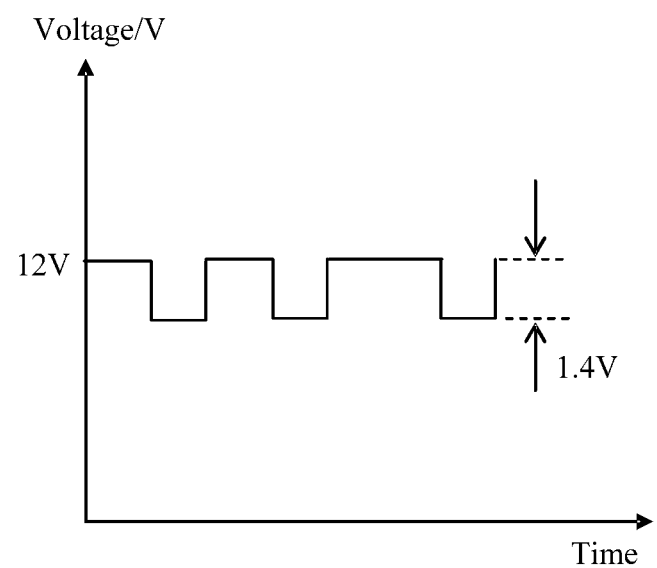
FIG. 3 shows a schematic diagram of a voltage waveform of a modulation signal according to an embodiment of the present disclosure.

The base station controller 102 controls Q to be continuously opened or closed, which causes continuous fluctuation of Vcc, thereby obtaining a voltage waveform shown in FIG. 3. A voltage difference between a voltage crest and a voltage valley is a voltage drop of the diode series branch circuit, for example, the sum of the voltage-drop of D1 and that of D2, 1.4 V. Therefore, a function of a switch modulator is implemented.

As shown in FIG. 1, the demodulation circuit 201 in the antenna 200 may include a comparator A1. A non-inverting input end of A1 is connected to the direct-current output end 22 of the Bias-T 2 by using a capacitor C1, and the non-inverting input end is connected to a grounding end by using a current-limiting resistor R1. An inverting input end of A1 is connected to the grounding end by using a current-limiting resistor R2. An output end of A1 is connected to the input end of the RCU, and the output end of A1 is connected to the inverting input end by using a feedback resistor R3. A direct-current voltage (not shown in FIG. 1) is input to a power supply end of A1.

Figure 4:
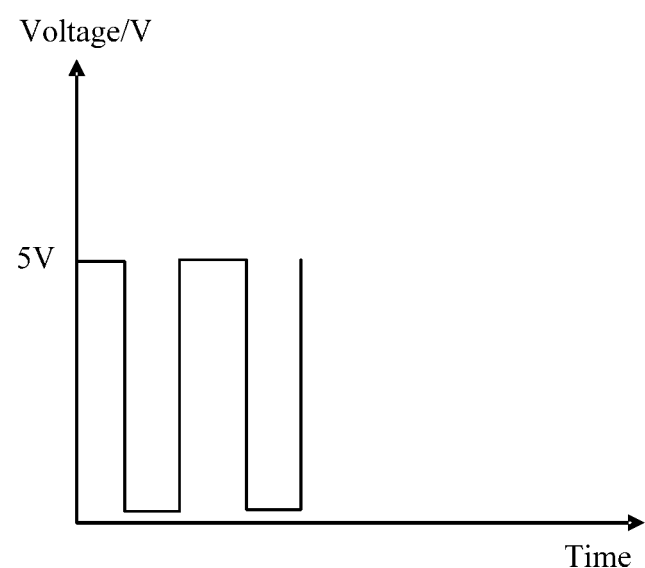
FIG. 4 shows a schematic diagram of a voltage waveform obtained from a demodulation circuit according to an embodiment of the present disclosure.

When a voltage of the non-inverting input end of A1 is higher than a reference voltage of the inverting input end, the output end outputs a high-level signal. When a voltage of the non-inverting input end of A1 is lower than a reference voltage of the inverting input end, the output end outputs a low-level signal. FIG. 4 shows a diagram of a voltage waveform output from a demodulation circuit, where a low electrical level is approximate to 0 V, and a high electrical level is 5 V.

The reference voltage of the inverting input end is set according to the modulation signal generated on the base station side. For example, if a high voltage of the modulation signal is 12 V and a low voltage is (12-1.4) V, the reference voltage may be set to 11 V.

Preferably, binary code corresponding to identifier information of the base station RF port may be added to the direct-current voltage signal to obtain the modulation signal, and the modulation signal is transmitted to the antenna. The antenna may obtain, by demodulating the modulation signal, the identifier information of the base station RF port R01 sending the modulation signal. The antenna feeds back, to the base station, the identifier information of the base station RF port and the identifier information of the antenna RF port A01 that is of the antenna and that receives the modulation signal. Therefore, the base station learns that the base station RF port R01 is connected to the antenna RF port A01, and further establishes the correspondence between the sector and the antenna according to a correspondence between the base station and the antenna RF port.

Figure 5:
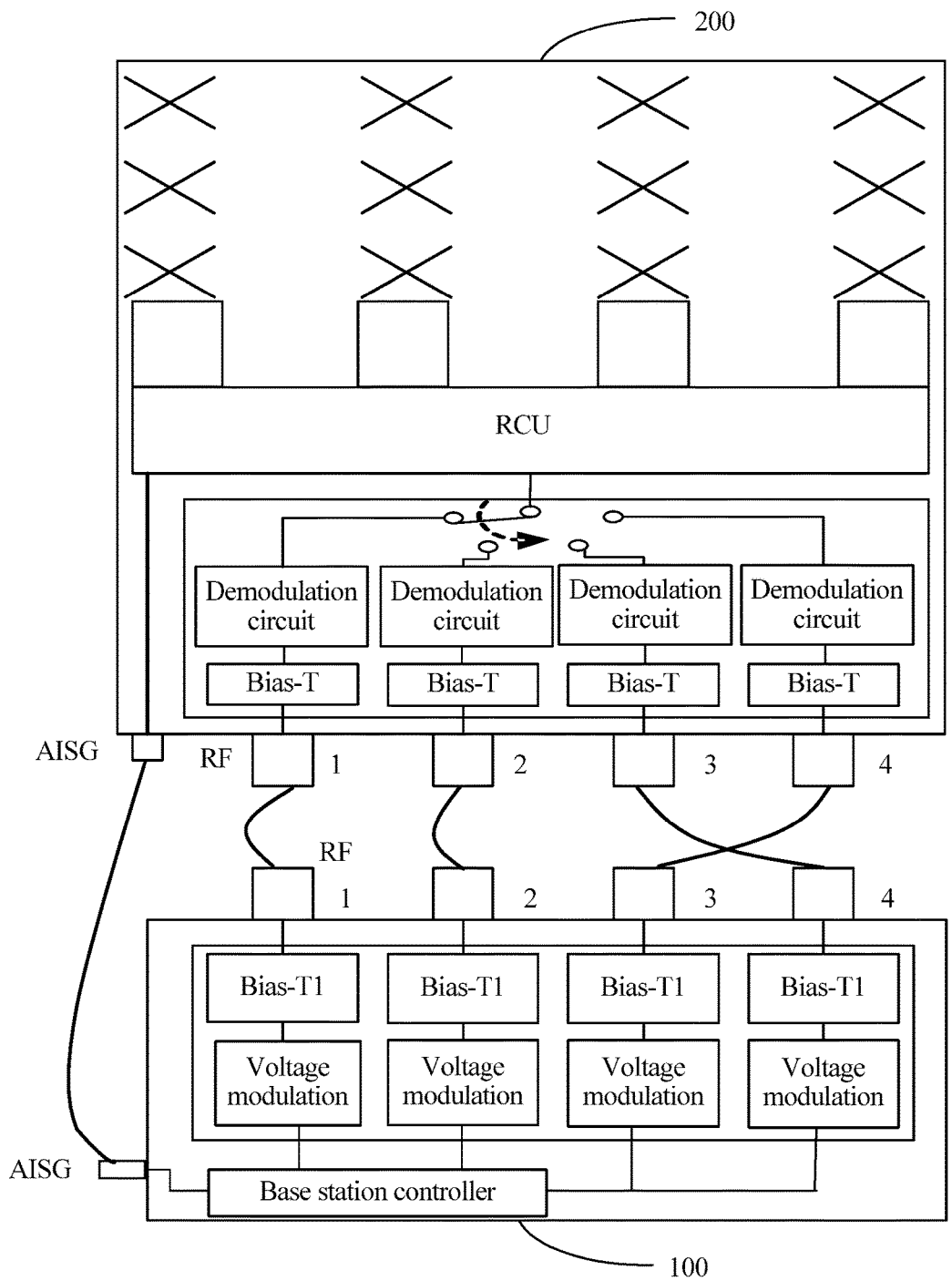
FIG. 5 shows a diagram of a multi-port antenna networking application scenario corresponding to the embodiment shown in FIG. 1.

Referring to FIG. 5, FIG. 5 shows a diagram of a multi-port antenna networking application scenario. As shown in FIG. 5, a base station 100 includes four RF ports, and an antenna 200 includes four RF ports. Each base station RF port has a unique identification number (that is, identifier information mentioned above). Each antenna RF port has a unique identification number (that is, identifier information).

A Bias-T 1 and a modulation circuit are disposed for each RF port inside the base station. Correspondingly, a Bias-T 2 and a demodulation circuit are disposed for each antenna RF port. In addition, a single-pole multi-throw switch is disposed between the demodulation circuits and an RCU. A non-movable end of the single-pole multi-throw switch is connected to an input end of the RCU, and each movable end is connected to an output end of the demodulation circuit. The RCU pre-records an antenna RF port corresponding to each movable end.

A base station controller (not shown in FIG. 5) inside the base station 100 is configured to control each modulation circuit to generate a modulation signal. The Bias-T 1 couples the modulation signal and a radio frequency signal, and then transmits a coupled signal to a corresponding antenna RF port on the antenna side. The corresponding Bias-T 2 splits the coupled signal received by each antenna RF port to obtain the modulation signal that is then transmitted to the RCU by using the single-pole multi-throw switch. Specifically, the RCU controls the single-pole multi-throw switch to be switched in a particular order, so as to receive the modulation signal received by each antenna RF port.

In an exemplary embodiment of the present disclosure, the base station controller may control the modulation circuits one by one to generate a modulation signal. Correspondingly, the RCU switches the single-pole multi-throw switch in an order, determines, according to correspondences between the movable ends of the single-pole multi-throw switch and the antenna RF ports, the antenna RF port receiving the modulation signal, and feeds back, to the base station, identifier information of the antenna RF port receiving the modulation signal. After receiving the identifier information, the base station controls the modulation circuit to stop outputting the modulation signal, controls a next modulation circuit to generate a modulation signal, and so on until all the base station RF ports output a modulation signal. Finally, a correspondence between each base station RF port and each antenna RF port is determined.

In another exemplary embodiment of the present disclosure, the base station controller controls all the modulation circuits inside the base station to simultaneously output the modulation signals. In this case, a corresponding modulation signal is generated according to preset information (for example, identifier information of an RF port) corresponding to each modulation circuit. The RCU on the antenna side controls the single-pole multi-throw switch to be switched in a particular order, so as to receive the modulation signal on each channel. The RCU demodulates the modulation signal to obtain identifier information of the base station RF port, and feeds back, to the base station by using an AISG port, the identifier information of the base station RF port, and an antenna RF port receiving the modulation signal. The base station may obtain a diagram of networking connection relationships between the base station RF ports, the antenna RF ports, and the RCU by means of drawing according to the information fed back by the antenna.

For example, a base station RF port 4 sends, to the antenna side, a modulation signal that includes identifier information of the port, and an antenna RF port 3 receives the modulation signal. The RCU obtains the identifier information of the base station RF port 4 by means of demodulation, and then feeds back, to the base station, the identifier information of the base station RF port 4 and identifier information of the antenna RF port 3, so that the base station learns that the base station RF port 4 is correspondingly connected to the antenna RF port 3.

Figure 6:
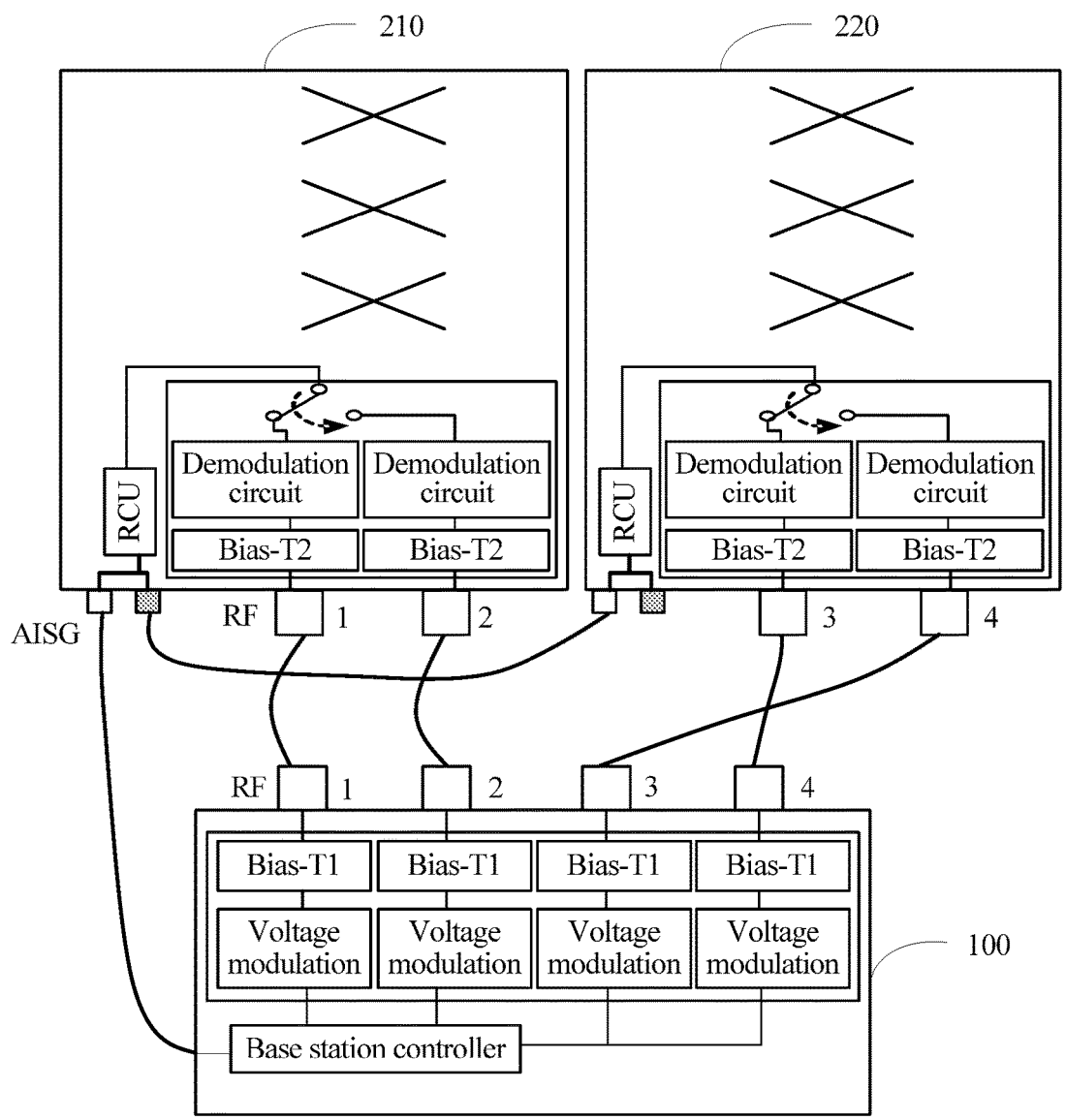
FIG. 6 shows a schematic diagram of a multi-antenna cascading networking scenario corresponding to the embodiment shown in FIG. 1.

Referring to FIG. 6, FIG. 6 shows a schematic diagram of a multi-antenna cascading networking scenario. As shown in FIG. 6, a base station 100 includes four RF ports. An antenna 210 includes an RF port 1 and an RF port 2, and an antenna 220 includes an RF port 3 and an RF port 4. A Bias-T 1 and a modulation circuit are disposed for each RF port inside the base station. Correspondingly, a Bias-T 2 and a demodulation circuit are disposed for each antenna RF port. In addition, a single-pole multi-throw switch is disposed inside each antenna. A connection manner of the single-pole multi-throw switch is similar to that in FIG. 5, and details are not described herein again.

A base station controller may simultaneously deliver a control instruction to RCUs of the two antennas by using an AISG port. An operation manner of the multi-antenna cascading networking scenario is similar to that in the embodiment corresponding to FIG. 5, and details are not described herein again.

For example, a base station RF port 3 sends, to the antenna side, a modulation signal that includes identifier information of the port, and an antenna RF port 4 receives the modulation signal. The RCU obtains the identifier information of the base station RF port 3 by means of demodulation, and then feeds back, to the base station, the identifier information of the base station RF port 3 and identifier information of the antenna RF port 4, so that the base station learns that the base station RF port 3 is correspondingly connected to the antenna RF port 4.

Figure 7:
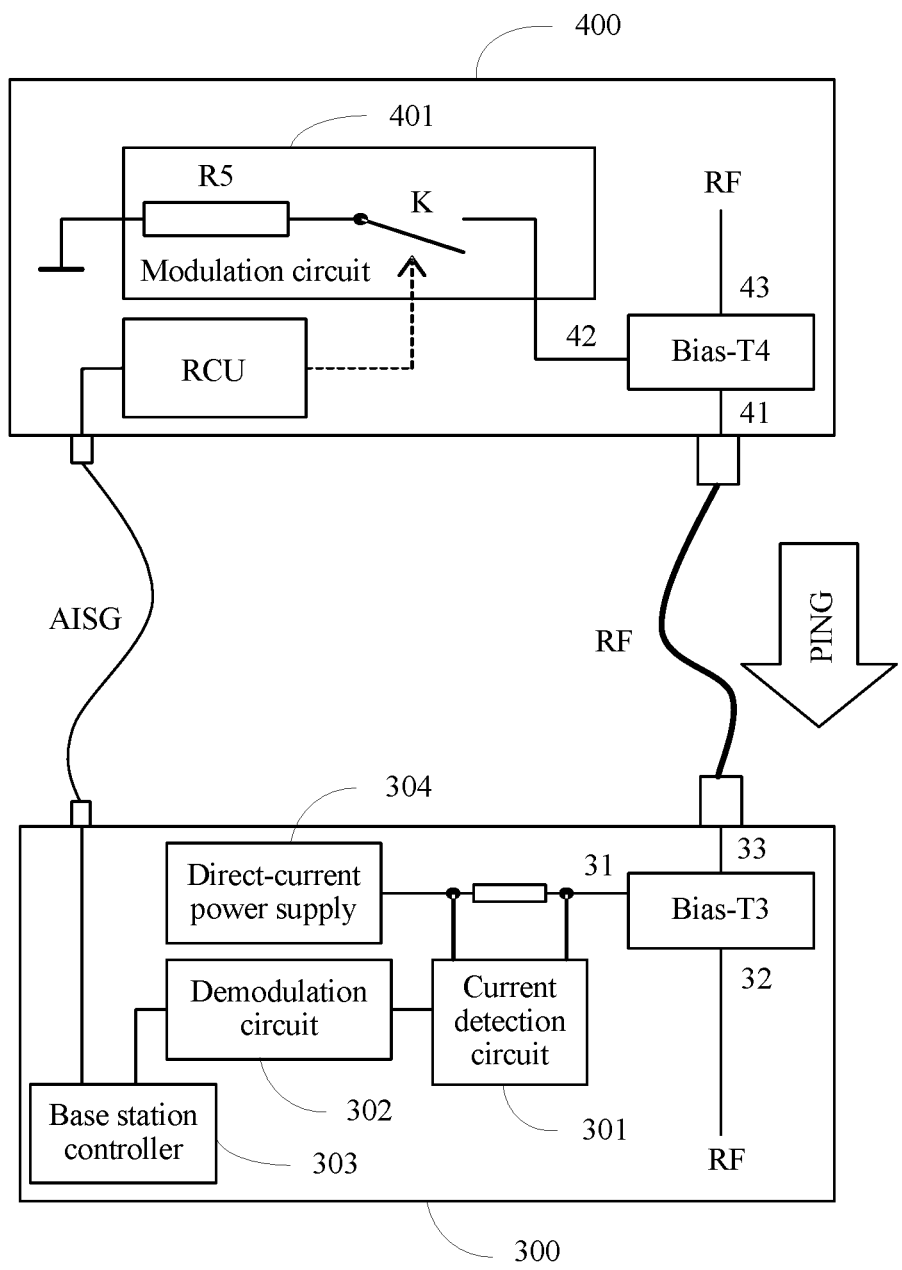
FIG. 7 shows another schematic structural diagram of a connection between an antenna and a base station according to an embodiment of the present disclosure.

Referring to FIG. 7, FIG. 7 shows another schematic structural diagram of a connection between an antenna and a base station according to the present disclosure.

As shown in FIG. 7, a base station 300 includes a Bias-T 3, a detection resistor R4, a current detection circuit 301, a demodulation circuit 302, a base station controller 303, and a direct-current power supply 304. The Bias-T 3, the current detection circuit, and the demodulation circuit are all in one-to-one correspondence with a base station radio frequency port.

A direct-current input end 31 of the Bias-T 3 is connected to the direct-current power supply 304 by using the detection resistor R4, a radio frequency signal is input to an alternating-current input end 32, and an alternating-current output end 33 is connected to a base station radio frequency port.

Two input ends of the current detection circuit 301 are connected in parallel to two ends of the detection resistor R4, and an output end is connected to an input end of the demodulation circuit 302. An output end of the demodulation circuit 302 is connected to an information input end of the base station controller 303.

The demodulation circuit 302 may be implemented by using a current comparator. A working process of the comparator is similar to that of the demodulation circuit in the foregoing embodiment, and details are not described herein again.

An antenna 400 includes an RCU, and a Bias-T 4 and a modulation circuit 401 that are in one-to-one correspondence with an antenna RF port.

An alternating-current input end 41 of the Bias-T 4 is connected to a radio frequency port on the antenna side, a direct-current output end 42 is connected to an input end of the modulation circuit 401, and an alternating-current output end 43 outputs a radio frequency signal. A control end of the modulation circuit 401 is connected to an output end of the RCU.

As shown in FIG. 7, a working process of a system in which the antenna is connected to the base station is as follows:

The direct-current power supply inside the base station transmits a direct-current voltage signal to the direct-current input end of the Bias-T 3. The Bias-T 3 couples the direct-current voltage signal and the radio frequency signal to obtain a coupled signal, and then transmits the coupled signal to the antenna side by using an RF port. After the antenna side receives the coupled signal, the Bias-T 4 splits the coupled signal, outputs the direct-current voltage signal by using the direct-current output end of the Bias-T 4, and outputs the radio frequency signal by using the alternating-current output end of the Bias-T 4.

When receiving a check request delivered by an operation and maintenance center, the base station controller 303 delivers a control instruction to the antenna by using an AISG port. The control instruction is used to enable the modulation circuit 401 to generate a current modulation signal according to the direct-current voltage signal output from the direct-current output end of the Bias-T 4. The current modulation signal includes identifier information of an antenna RF port receiving the coupled signal. In this case, the current detection circuit 301 on the base station side can detect the current modulation signal. The demodulation circuit 302 demodulates the current modulation signal to obtain the identifier information of the antenna RF port, and then transmits the identifier information to the base station controller 303. The base station controller 303 determines that the antenna RF port corresponding to the received identifier information is correspondingly connected to the base station RF port sending the coupled signal, and further determines a correspondence between a sector of the base station and the antenna.

It should be noted that the current detection circuit in this embodiment may be an existing current detection circuit inside the base station. Therefore, circuit costs can be reduced.

Optionally, referring to FIG. 7, the modulation circuit 401 may include a pull-down resistor R5 and a control switch K. The control switch K is the same as the foregoing control switch Q, and may be implemented by using a switching transistor such as a triode or a MOS transistor.

A first end of the control switch K is connected to a grounding end by using the pull-down resistor R5, a second end is the input end of the modulation circuit 401, and a control end of the control switch K is the control end of the modulation circuit 401.

When receiving a control command that is for generating a modulation signal and that is delivered by the base station controller by using the AISG port, the RCU of the antenna controls K to be closed. In this case, the pull-down resistor and the direct-current voltage signal output from the direct-current output end of the Bias-T 4 form a path, that is, a current load of the direct-current output end of the Bias-T 4 changes. K is controlled to be continuously closed or opened according to the identifier information of the antenna RF port. That is, the identifier information of the antenna RF port is added to the direct-current signal to obtain the current modulation signal. In this case, the current detection circuit that is on the base station side and that is corresponding to the antenna RF port corresponding to the control switch K on the antenna side can detect a current change. The base station controller determines that there is a correspondence between the antenna RF port with a switch-on or switch-off operation and the base station RF port on which the current changes occurs.

Figure 8:
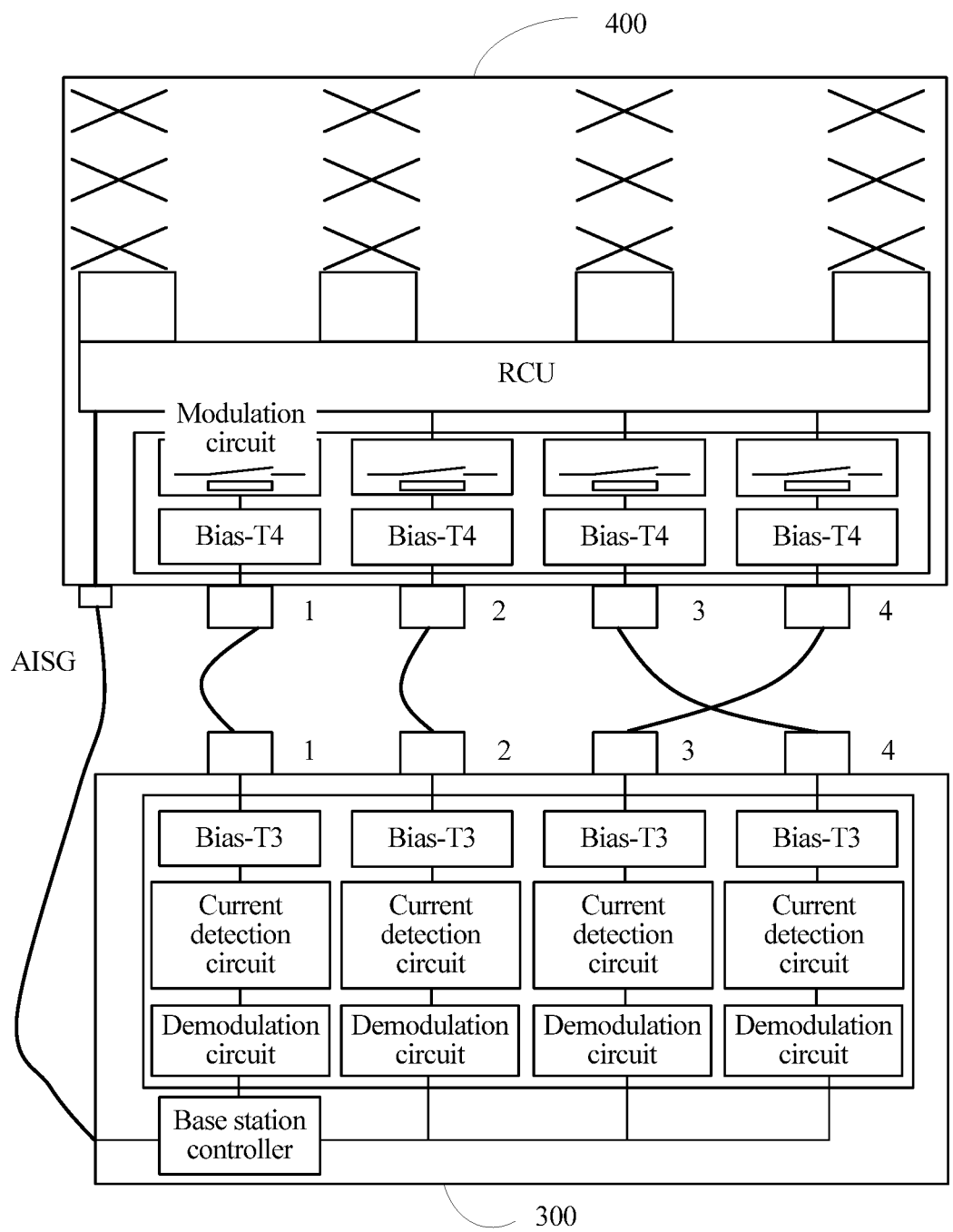
FIG. 8 shows a diagram of a multi-port antenna networking scenario corresponding to the embodiment shown in FIG. 7.

Referring to FIG. 8, FIG. 8 shows a diagram of a multi-port antenna networking scenario corresponding to the embodiment shown in FIG. 7. As shown in FIG. 8, a base station 300 includes four RF ports, and an antenna 400 includes four RF ports. Each base station RF port has a unique identification number (that is, identifier information mentioned above). Each antenna RF port has a unique identification number (that is, identifier information).

A Bias-T 3, a current detection circuit, and a demodulation circuit are all disposed for each RF port inside the base station. Correspondingly, a Bias-T 4 and a modulation circuit are disposed for each antenna RF port.

In an exemplary embodiment of the present disclosure, a base station controller may control the modulation circuits on the antenna side one by one to generate a current modulation signal. Therefore, the base station controller establishes correspondences between the antenna RF ports and the base station RF ports one by one. Finally, an entire antenna connection relationship diagram is obtained.

In another exemplary embodiment of the present disclosure, a base station controller may simultaneously control the modulation circuits on the antenna side to generate current modulation signals. The base station controller detects the current modulation signals, obtains, by means of demodulation, identifier information of the corresponding antenna RF ports generating the current modulation signals. Therefore, base station RF ports detecting the current modulation signals are correspondingly connected to the antenna RF ports corresponding to the identifier information. Finally, an entire antenna connection relationship diagram is obtained. A specific working process is the same as that in the embodiment shown in FIG. 7, and details are not described herein again.

Figure 9:
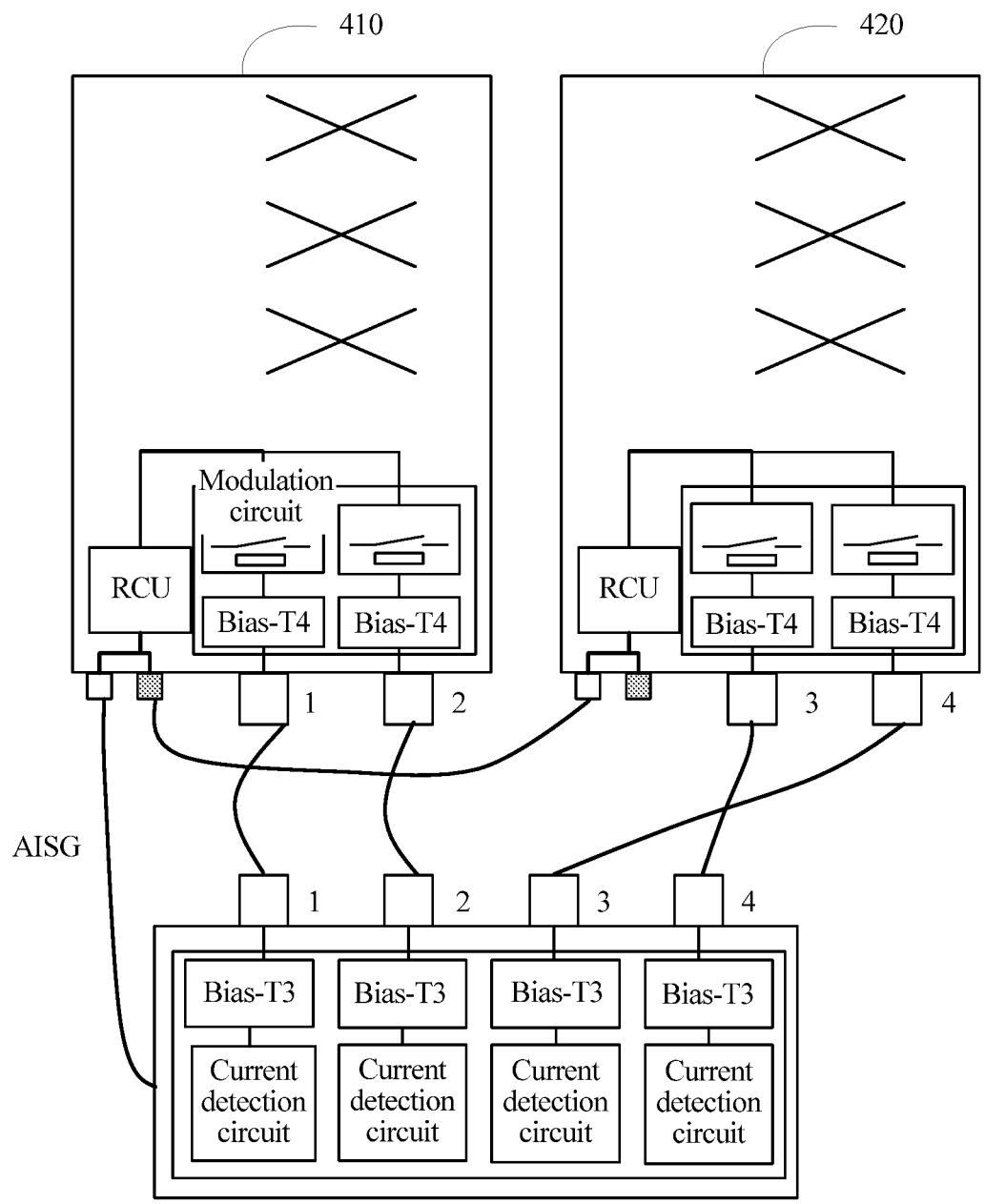
FIG. 9 shows a schematic diagram of a multi-antenna cascading networking scenario corresponding to the embodiment shown in FIG. 7.

Referring to FIG. 9, FIG. 9 shows a schematic diagram of a multi-antenna cascading networking scenario corresponding to the embodiment shown in FIG. 7.

As shown in FIG. 9, a base station 100 includes four RF ports, and a connection manner of a base station controller is the same as the manner shown in FIG. 8. An antenna 410 includes an RF port 1 and an RF port 2, and an antenna 420 includes an RF port 3 and an RF port 4. A Bias-T 3, a current detection circuit, and a demodulation circuit are all disposed for each RF port inside the base station. Correspondingly, a Bias-T 4 and a modulation circuit are disposed for each antenna RF port. On a multi-antenna cascading network, the base station may simultaneously control multiple cascaded antennas by using an AISG port.

A process of establishing a correspondence between an antenna RF port and a base station RF port on the multi-antenna cascading network is the same as that in the embodiment shown in FIG. 8, and details are not described herein again.

Figure 10:
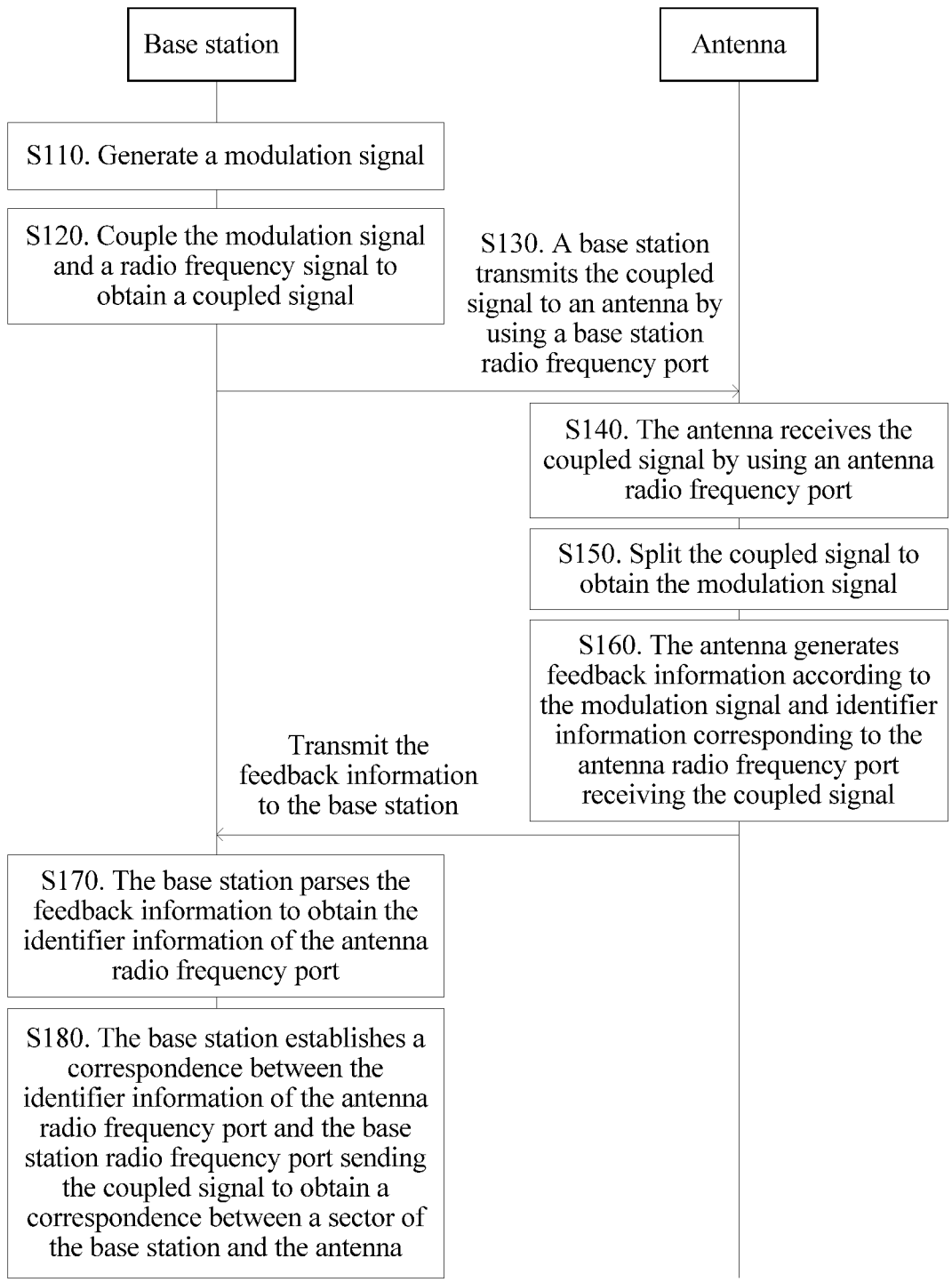
FIG. 10 shows a schematic flowchart of a method for establishing a correspondence between a sector of a base station and an antenna according to an embodiment of the present disclosure.

Referring to FIG. 10, FIG. 10 shows a schematic flowchart of a method for establishing a correspondence between a sector of a base station and an antenna according to an embodiment of the present disclosure. The method is applied to a system in which a base station is connected to an antenna.

After receiving a request that is for establishing a correspondence between a sector of the base station and the antenna and that is delivered by an operation and maintenance center, the base station performs the following steps:

Step S110: The base station generates a modulation signal.

Optionally, after receiving the foregoing request information, the base station first commands the antenna to receive a signal, receives response information of the antenna, and then generates the modulation signal.

Optionally, the base station may add identifier information of a radio frequency signal of the base station to a radio frequency signal to obtain the modulation signal.

Step S120: The base station couples the modulation signal and a radio frequency signal to obtain a coupled signal.

Step S130: The base station transmits the coupled signal to the antenna by using a base station radio frequency port.

Step S140: The antenna receives the coupled signal by using an antenna radio frequency port.

Step S150: The antenna splits the coupled signal to obtain the modulation signal.

The antenna may split, by using a T-shaped bias tee, the coupled signal to obtain the alternating-current radio frequency signal and the direct-current modulation signal.

Step S160: The antenna generates feedback information according to the modulation signal and identifier information corresponding to the antenna radio frequency port receiving the coupled signal, and transmits the feedback information to the base station.

The antenna feeds back the feedback information to the base station by using an AISG port.

Step S170: The base station parses the feedback information to obtain the identifier information of the antenna radio frequency port.

Step S180: The base station establishes a correspondence between the identifier information of the antenna radio frequency port and the base station radio frequency port sending the coupled signal to obtain a correspondence between a sector of the base station and the antenna.

In an exemplary embodiment of the present disclosure, after receiving the modulation signal, the antenna feeds back, to the base station, the identifier information corresponding to the antenna radio frequency port receiving the modulation signal. In this way, the base station can determine that the radio frequency signal of the base station sending the modulation signal is correspondingly connected to the antenna radio frequency port receiving the modulation signal.

In another exemplary embodiment of the present disclosure, the base station may control base station radio frequency ports to generate a modulation signal one by one, and successively determine that each base station may further add preset information to the modulation signal. Even though the base station radio frequency ports simultaneously send the modulation signals, the base station may establish a correspondence between a base station radio frequency port and an antenna radio frequency port according to identifier information of the antenna radio frequency ports and the included preset information that are fed back by the antenna.

This embodiment provides the method for establishing a correspondence between a sector of a base station and an antenna. A base station generates a modulation signal, and transmits the modulation signal to a corresponding antenna by using a radio frequency port. After receiving the modulation signal, the antenna generates feedback information and feeds back the feedback information to the base station. Therefore, the base station determines that there is a correspondence between the base station radio frequency port sending the modulation signal and an antenna radio frequency port receiving the modulation signal, and further automatically establishes a correspondence between a sector and the antenna, which is highly efficient and highly accurate in comparison with a manual recording manner.

Figure 11:
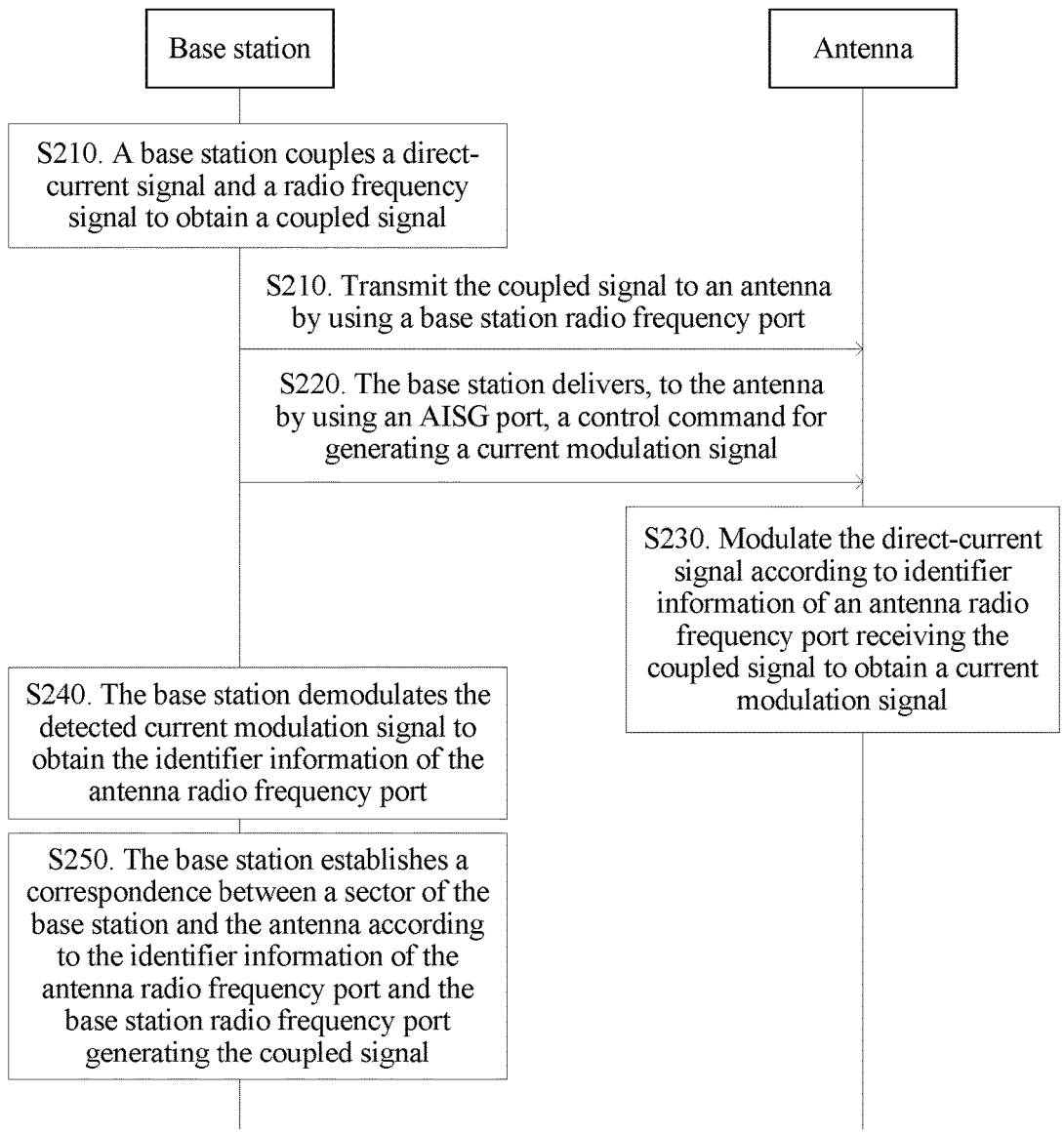
FIG. 11 shows a schematic flowchart of another method for establishing a correspondence between a sector of a base station and an antenna according to an embodiment of the present disclosure.

Referring to FIG. 11, FIG. 11 shows a schematic flowchart of another method for establishing a correspondence between a sector of a base station and an antenna according to an embodiment of the present disclosure. The method is applied to a system in which a base station is connected to an antenna.

As shown in FIG. 11, the method includes the following steps:

Step S210: The base station couples a direct-current signal and a radio frequency signal to obtain a coupled signal, and transmits the coupled signal to the antenna by using a base station radio frequency port.

The direct-current signal and the radio frequency signal may be coupled by using a T-shaped bias tee.

Step S220: The base station delivers, to the antenna by using an AISG port, a control command for generating a current modulation signal.

After receiving a request that is for establishing a correspondence between a sector of the base station and the antenna and that is delivered by an operation and maintenance center, the base station delivers the control command to the antenna.

Step S230: After receiving the control command, the antenna modulates, according to identifier information of an antenna radio frequency port receiving the coupled signal, the direct-current signal in the coupled signal transmitted by the base station to obtain a current modulation signal.

In an exemplary embodiment of the present disclosure, the current modulation signal may be generated by using the modulation circuit 401 shown in FIG. 7. The current modulation signal is obtained by adding, to the direct-current signal, the identifier information of the antenna radio frequency port receiving the coupled signal.

Step S240: The base station demodulates the detected current modulation signal to obtain the identifier information of the antenna radio frequency port. The current modulation signal may be demodulated by using the demodulation circuit 302 shown in FIG. 7.

Step S250: The base station establishes a correspondence between a sector of the base station and the antenna according to the identifier information of the antenna radio frequency port and the base station radio frequency port generating the coupled signal.

This embodiment provides the method for establishing a correspondence between a sector of a base station and an antenna. An antenna generates a current modulation signal that includes identifier information of an antenna RF port. A base station can detect the current modulation signal, and demodulate the current modulation signal to obtain the antenna RF port generating the current modulation signal. Therefore, the base station determines that there is a correspondence between the antenna RF port generating the current modulation signal and a base station RF port detecting the current modulation signal, and further automatically establishes a correspondence between a sector and the antenna, which is highly efficient and highly accurate in comparison with a manual recording manner.

The embodiments in this specification are all described in a progressive manner. For same or similar parts in the embodiments, reference may be made to these embodiments. Each embodiment focuses on a difference from other embodiments. Especially, apparatus or system embodiments are basically similar to a method embodiment, and therefore are described briefly. For related parts, reference may be made to partial descriptions in the method embodiment. The described apparatus and system embodiments are merely exemplary. The units described as separate parts may or may not be physically separate, and parts displayed as units may or may not be physical units, may be located in one location, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The present disclosure can be described in the general context of executable computer instructions executed by a computer, for example, a program module. Generally, the program unit includes a routine, a program, an object, a component, a data structure, and the like for executing a particular task or implementing a particular abstract data type. The present disclosure may also be practiced in distributed computing environments in which tasks are executed by remote processing devices that are connected through a communications network. In a distributed computing environment, the program module may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements that are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementation manners of the present disclosure. It should be noted that a person of ordinary skill in the art may make some improvements or polishing without departing from the principle of the present disclosure and the improvements or polishing shall fall within the protection scope of the present disclosure.

What is claimed is:

1. A base station comprising:
a direct-current power supply;
a modulation circuit comprising an input end coupled to the direct-current power supply, an output end, and a control end, wherein the modulation circuit is configured to generate a modulation signal;
a base station radio frequency (RF) port;
a T-shaped bias tee comprising a direct-current input end coupled to the output end, an alternating-current input end configured to input an RF signal, and an output end coupled to the base station RF port, wherein the T-shaped bias tee is configured to:
couple the modulation signal and the RF signal to obtain a coupled signal; and
transmit the coupled signal to an antenna using the base station RF port so that the antenna demodulates the coupled signal and transmits feedback information to the base station using an Antenna Interface Standards Group (AISG) input port, wherein the feedback information comprises identifier information of an antenna RF port receiving the coupled signal; and
a base station controller comprising an output end coupled to the control end, wherein the base station controller is configured to:
control the modulation circuit to generate the modulation signal;
receive the feedback information; and
establish a correspondence between a sector of the base station and the antenna according to the feedback information.

2. The base station of claim 1, wherein the output end is configured to output identifier information of the base station RF port, and wherein the modulation circuit is further configured to add the identifier information to a direct-current voltage signal to obtain the modulation signal.

3. The base station of claim 1, wherein the modulation circuit further comprises a co-directional diode series branch circuit and a control switch, wherein an anode of the co-directional diode series branch circuit is the input end and a cathode is the output end, wherein the control switch is connected in parallel to two ends of the co-directional diode series branch circuit by a first end and a second end, and wherein the control switch comprises the control end.

4. The base station of claim 3, wherein the control switch is an NPN transistor or an n-type metal-oxide-semiconductor (NMOS) transistor, and wherein a base electrode of the NPN transistor is the control end, a collector electrode is coupled to the anode, and an emitter electrode is coupled to the cathode.

5. The base station of claim 3, wherein the control switch is an NPN transistor or an n-type metal-oxide-semiconductor (NMOS) transistor, and wherein a gate electrode of the NMOS transistor is the control end, a drain electrode is coupled to the anode, and a source electrode is coupled to the cathode.

6. An antenna comprising:
an antenna radio frequency (RF) port configured to receive a coupled signal from a base station; and
a T-shaped bias tee comprising an alternating-current input end coupled to the antenna RF port, a direct-current output end, and an alternating-current output end configured to output an RF signal, wherein the T-shaped bias tee is configured to decouple the coupled signal to obtain a modulation signal;
a demodulation circuit comprising an input end coupled to the direct-current output end and an output end, wherein the demodulation circuit is configured to:
receive the modulation signal from the T-shaped bias tee; and
demodulate the modulation signal to obtain a demodulated signal; and
a remote control unit (RCU) comprising an RCU input end coupled to the output end, wherein the RCU is configured to:
receive the demodulated signal from the demodulation circuit;
generate feedback information according to the demodulated signal;
generate identifier information corresponding to the antenna RF port; and
provide the feedback information to the base station using an Antenna Interface Standards Group (AISG) input port, wherein the feedback information enables the base station to establish a correspondence between a sector of the base station and the antenna.

7. The antenna of claim 6, wherein the antenna further comprises a single-pole multi-throw switch when the antenna comprises multiple antenna RF ports, wherein the single-pole multi-throw switch comprises a non-movable end coupled to the RCU input end and a movable end separately coupled to the output end, and wherein the RCU is configured to a switch-on or switch-off state of the single-pole multi-throw switch.

8. The antenna of claim 6, wherein the demodulation circuit further comprises a comparator comprising a non-inverting input end coupled to the alternating-current output end using a capacitor, an inverting input end coupled to a grounding end using a current-limiting resistor, a comparator output end coupled to the RCU input end and coupled to the inverting input end using a feedback resistor.

9. A base station comprising:
an antenna;
a direct-current power supply;
a detection resistor comprising two ends;
a current detection circuit comprising two input ends coupled in parallel to the two ends and a current detection output end, wherein the current detection circuit is configured to detect a current modulation signal fed back by the antenna;

a base station radio frequency (RF) port;

a T-shaped bias tee comprising a direct-current input end coupled to the direct-current power supply using the detection resistor, an alternating-current input end configured to receive an RF signal, and an alternating-current output end coupled to the base station RF port, and wherein the T-shaped bias tee is configured to:

couple a direct-current signal input from the direct-current input end and the RF signal to obtain a coupled signal; and transmit the coupled signal to the antenna so that the antenna splits the coupled signal to obtain the direct-current signal, modulates a current of the direct-current signal to obtain the current modulation signal, and feeds back the current modulation signal to the base station using an antenna RF port, wherein the current modulation signal comprises identifier information of the antenna RF port;

a demodulation circuit comprising a demodulation circuit output end and a demodulation circuit input end coupled to the current detection output end, wherein the demodulation circuit is configured to demodulate the current modulation signal to obtain a demodulated signal; and a base station controller comprising an information input end coupled to the demodulation circuit output end, wherein the base station controller is configured to:

determine a correspondence between the antenna RF port and the base station RF port according to the demodulated signal;

establish a correspondence between a sector of the base station and the antenna; and control, using an Antenna Interface Standards Group (AISG) port, the antenna to generate the current modulation signal.

10. The base station of claim 9, wherein the T-shaped bias tee, the current detection circuit, and the demodulation circuit are in one-to-one correspondence with the base station RF port.

11. The base station of claim 10, wherein the demodulation circuit further comprises a comparator comprising a non-inverting input end coupled to the current detection output end using a capacitor, an inverting input end coupled to a grounding end using a current-limiting resistor, a comparator output end coupled to the information input end and the inverting input end using a feedback resistor.

* * * * *

UNITED STATES PATENT AND TRADEMARK OFFICE
CERTIFICATE OF CORRECTION

PATENT NO.        : 9,699,672 B2                                    Page 1 of 1
APPLICATION NO.   : 15/350991
DATED             : July 4, 2017
INVENTOR(S)       : Jian Shen et al.

It is certified that error appears in the above-identified patent and that said Letters Patent is hereby corrected as shown below:

On the Title Page

(72) Inventors should read:
Jian Shen, Shenzhen (CN); Kari Piispanen, Munich (DE)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*